(12) United States Patent
Rosenberg et al.

(10) Patent No.: US 7,940,722 B1
(45) Date of Patent: May 10, 2011

(54) SYSTEM AND METHOD FOR DETERMINING A NETWORK FOR PROCESSING APPLICATIONS FOR A COMMUNICATION SESSION

(75) Inventors: Jonathan D. Rosenberg, Freehold, NJ (US); Flemming S. Andreasen, Marlboro, NJ (US); Timothy P. Stammers, Raleigh, NC (US); Jayaraman R. Iyer, Sunnyvale, CA (US); Biswaranjan Panda, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 11/715,019

(22) Filed: Mar. 6, 2007

Related U.S. Application Data

(60) Provisional application No. 60/780,176, filed on Mar. 6, 2006.

(51) Int. Cl.
*H04W 4/00* (2009.01)
(52) U.S. Cl. ........ 370/329; 370/328; 370/335; 370/337; 709/227; 455/435.1
(58) Field of Classification Search .................. 370/231, 370/331, 329, 328, 335, 337; 709/227; 455/435.1
See application file for complete search history.

(56) References Cited

U.S. PATENT DOCUMENTS

| | | | |
|---|---|---|---|
| 5,602,907 A | 2/1997 | Hata et al. | 379/114 |
| 5,822,411 A | 10/1998 | Swale et al. | 379/111 |
| 5,828,737 A | 10/1998 | Sawyer | 379/114 |
| 5,905,736 A | 5/1999 | Ronen et al. | 370/546 |
| 5,909,238 A | 6/1999 | Nagashima et al. | 348/3 |
| 5,946,670 A | 8/1999 | Motohashi et al. | 705/400 |
| 5,956,391 A | 9/1999 | Melen et al. | 379/114 |
| 5,970,477 A | 10/1999 | Roden | 705/32 |
| 5,987,498 A | 11/1999 | Athing et al. | 709/203 |
| 6,016,509 A | 1/2000 | Dedrick | 709/224 |
| 6,035,281 A | 3/2000 | Crosskey et al. | 705/14 |
| 6,047,051 A | 4/2000 | Ginzboorg et al. | 379/130 |
| 6,070,192 A | 5/2000 | Holt et al. | 709/227 |
| 6,075,854 A | 6/2000 | Copley et al. | 379/211 |
| 6,131,024 A | 10/2000 | Boltz | 455/405 |
| 6,137,791 A | 10/2000 | Frid et al. | 370/352 |
| 6,141,684 A | 10/2000 | McDonald et al. | 709/222 |
| 6,175,879 B1 | 1/2001 | Shah et al. | 709/330 |
| 6,208,977 B1 | 3/2001 | Hernandez et al. | 705/34 |
| 6,229,887 B1 | 5/2001 | Albers et al. | 379/219 |

(Continued)

FOREIGN PATENT DOCUMENTS

WO    WO 98/26381    12/1997

(Continued)

OTHER PUBLICATIONS

Draft—TR45—PN-3-4732-RV4 (to be published as TIA-835.1-D), 32 pages.

(Continued)

*Primary Examiner* — Pierre-Louis Desir
(74) *Attorney, Agent, or Firm* — Baker Botts L.L.P.

(57) ABSTRACT

A method for selecting an IP address for an application used in a network environment may include receiving data of a network's capabilities, receiving data of a subscriber's applications, and receiving data of a subscriber's needs. The method may also include generating a policy document, such that the policy document associates an IP address with each application based on the subscriber's needs and the network's capabilities.

29 Claims, 3 Drawing Sheets

U.S. PATENT DOCUMENTS

| | | | |
|---|---|---|---|
| 6,282,573 B1 | 8/2001 | Darago et al. | 709/229 |
| 6,295,447 B1 | 9/2001 | Reichelt et al. | 455/417 |
| 6,330,562 B1 | 12/2001 | Boden et al. | 707/10 |
| 6,332,163 B1 | 12/2001 | Bowman-Amauh | 709/231 |
| 6,339,832 B1 | 1/2002 | Bowman-Amauh | 714/35 |
| 6,434,568 B1 | 8/2002 | Bowman-Amauh | 707/103 R |
| 6,434,628 B1 | 8/2002 | Bowman-Amauh | 714/48 |
| 6,438,594 B1 | 8/2002 | Bowman-Amauh | 709/225 |
| 6,442,748 B1 | 8/2002 | Bowman-Amauh | 717/108 |
| 6,466,964 B1 | 10/2002 | Leung et al. | 709/202 |
| 6,477,580 B1 | 11/2002 | Bowman-Amauh | 709/231 |
| 6,477,665 B1 | 11/2002 | Bowman-Amauh | 714/39 |
| 6,480,485 B1 | 11/2002 | Kari et al. | 370/352 |
| 6,490,451 B1 | 12/2002 | Denman et al. | 455/436 |
| 6,493,547 B1 | 12/2002 | Raith | 455/405 |
| 6,496,850 B1 | 12/2002 | Bowman-Amauh | 709/203 |
| 6,502,213 B1 | 12/2002 | Bowman-Amauh | 714/49 |
| 6,510,513 B1 | 1/2003 | Danieli | 713/156 |
| 6,529,909 B1 | 3/2003 | Bowman-Amauh | 707/10 |
| 6,529,948 B1 | 3/2003 | Bowman-Amauh | 709/217 |
| 6,539,396 B1 | 3/2003 | Bowman-Amauh | 707/103 R |
| 6,549,949 B1 | 4/2003 | Bowman-Amauh | 709/236 |
| 6,550,057 B1 | 4/2003 | Bowman-Amauh | 717/126 |
| 6,571,282 B1 | 5/2003 | Bowman-Amauh | 709/219 |
| 6,578,068 B1 | 6/2003 | Bowman-Amauh | 709/203 |
| 6,601,192 B1 | 7/2003 | Bowman-Amauh | 714/38 |
| 6,601,234 B1 | 7/2003 | Bowman-Amauh | 717/108 |
| 6,606,660 B1 | 8/2003 | Bowman-Amauh | 709/227 |
| 6,611,821 B2 | 8/2003 | Stahl et al. | 705/400 |
| 6,615,199 B1 | 9/2003 | Bowman-Amauh | 706/50 |
| 6,615,253 B1 | 9/2003 | Bowman-Amauh | 709/219 |
| 6,615,263 B2 | 9/2003 | Dulai et al. | 709/225 |
| 6,621,820 B1 | 9/2003 | Williams et al. | 370/395.31 |
| 6,636,242 B2 | 10/2003 | Bowman-Amauh | 715/764 |
| 6,640,238 B1 | 10/2003 | Bowman-Amauh | 709/201 |
| 6,640,244 B1 | 10/2003 | Bowman-Amauh | 709/207 |
| 6,647,262 B1 | 11/2003 | Demetrescu et al. | 455/436 |
| 6,665,537 B1 | 12/2003 | Lioy | 455/435 |
| 6,665,718 B1 | 12/2003 | Chuah et al. | 709/225 |
| 6,671,675 B2 | 12/2003 | Iwamura | 705/30 |
| 6,684,243 B1 | 1/2004 | Euget et al. | 709/222 |
| 6,684,256 B1 | 1/2004 | Warrier et al. | 709/238 |
| 6,708,225 B1 | 3/2004 | Cho et al. | 709/317 |
| 6,714,515 B1 | 3/2004 | Marchand | 370/231 |
| 6,715,145 B1 | 3/2004 | Bowman-Amauh | 718/101 |
| 6,728,266 B1 | 4/2004 | Sabry et al. | 370/468 |
| 6,728,365 B1 | 4/2004 | Li et al. | 379/329 |
| 6,728,884 B1 | 4/2004 | Lim | 713/201 |
| 6,742,015 B1 | 5/2004 | Bowman-Amauh | 718/101 |
| 6,742,036 B1 | 5/2004 | Das et al. | 709/226 |
| 6,757,371 B2 | 6/2004 | Kim et al. | 379/114.22 |
| 6,760,444 B1 | 7/2004 | Leung | 380/270 |
| 6,768,726 B2 | 7/2004 | Dorenbosch et al. | 370/331 |
| 6,769,000 B1 | 7/2004 | Akhtar et al. | 707/103 R |
| 6,771,623 B2 | 8/2004 | Ton | 370/331 |
| 6,785,256 B2 | 8/2004 | O'Neill | 370/338 |
| 6,804,518 B2 | 10/2004 | Core et al. | 455/436 |
| 6,826,173 B1 | 11/2004 | Kung et al. | 370/352 |
| 6,829,709 B1 | 12/2004 | Acharya et al. | 713/160 |
| 6,834,341 B1 | 12/2004 | Bahl et al. | 713/156 |
| 6,839,338 B1 | 1/2005 | Amara et al. | 370/338 |
| 6,842,906 B1 | 1/2005 | Bowman-Amauh | 719/330 |
| 6,856,676 B1 | 2/2005 | Pirot et al. | 379/201.01 |
| 6,889,321 B1 | 5/2005 | Kung et al. | 713/153 |
| 6,907,501 B2 | 6/2005 | Tariq et al. | 711/118 |
| 6,910,074 B1 | 6/2005 | Amin et al. | 709/227 |
| 6,915,345 B1 | 7/2005 | Tummala et al. | 709/225 |
| 6,917,605 B2 | 7/2005 | Kakemizu et al. | 370/338 |
| 6,920,503 B1 | 7/2005 | Nanji et al. | 709/230 |
| 6,922,404 B1 | 7/2005 | Narayanan et al. | 370/338 |
| 6,925,160 B1 | 8/2005 | Stevens et al. | 379/121.05 |
| 6,947,401 B2 | 9/2005 | El-Malki et al. | 370/338 |
| 6,961,774 B1 | 11/2005 | Shannon et al. | 709/227 |
| 6,967,941 B2 | 11/2005 | Roy | 370/338 |
| 6,978,128 B1 | 12/2005 | Raman et al. | 455/414 |
| 6,980,802 B2 | 12/2005 | Jung | 455/436 |
| 6,980,962 B1 | 12/2005 | Arganbright et al. | 705/26 |
| 6,981,047 B2 | 12/2005 | Hanson et al. | 709/227 |
| 6,982,967 B1 | 1/2006 | Leung | 370/328 |
| 6,990,337 B2 | 1/2006 | O'Neill et al. | 455/422.1 |
| 6,993,333 B2 | 1/2006 | Laroia et al. | 455/436 |
| 7,003,294 B2 | 2/2006 | Singhai et al. | 455/435.1 |
| 7,020,697 B1 | 3/2006 | Goodman et al. | 709/223 |
| 7,024,687 B2 | 4/2006 | Chaudhuri et al. | 726/3 |
| 7,028,311 B2 | 4/2006 | Roach et al. | 719/328 |
| 7,039,027 B2 | 5/2006 | Bridgelall | 370/329 |
| 7,054,268 B1 | 5/2006 | Parantainen et al. | 370/231 |
| 7,079,499 B1 | 7/2006 | Akhtar et al. | 370/310 |
| 7,082,301 B2 | 7/2006 | Jagadeesan et al. | 455/436 |
| 7,103,359 B1 | 9/2006 | Heinonen et al. | 455/436 |
| 7,127,234 B2 | 10/2006 | Ishii | 455/411 |
| 7,130,286 B2 | 10/2006 | Koodli et al. | 370/331 |
| 7,133,386 B2 | 11/2006 | Holur et al. | 370/331 |
| 7,151,758 B2 | 12/2006 | Kumaki et al. | 370/331 |
| 7,151,772 B1 | 12/2006 | Kalmanek et al. | 370/390 |
| 7,154,868 B1 | 12/2006 | Sharma et al. | 370/331 |
| 7,161,914 B2 | 1/2007 | Shoaib et al. | 370/331 |
| 7,171,555 B1 | 1/2007 | Salowey et al. | 713/156 |
| 7,184,418 B1 | 2/2007 | Baba et al. | 370/331 |
| 7,187,931 B2 | 3/2007 | Trossen | 455/440 |
| 7,190,793 B2 | 3/2007 | Hsu | 380/270 |
| 7,197,763 B2 | 3/2007 | Hsu | 726/4 |
| 7,212,821 B2 | 5/2007 | Laroia et al. | 455/437 |
| 7,230,951 B2 | 6/2007 | Mizell et al. | 370/401 |
| 7,233,583 B2 | 6/2007 | Asthana et al. | 370/332 |
| 7,251,733 B2 | 7/2007 | Haverinen et al. | 713/182 |
| 7,263,371 B2 | 8/2007 | Das et al. | 455/456.1 |
| 7,269,727 B1 | 9/2007 | Mukherjee et al. | 713/160 |
| 7,272,122 B2 | 9/2007 | Trossen et al. | 370/331 |
| 7,272,123 B2 | 9/2007 | Wall | 370/331 |
| 7,275,156 B2 | 9/2007 | Balfanz et al. | 713/168 |
| 7,389,106 B2 | 6/2008 | Dawson et al. | 455/406 |
| 2001/0023428 A1 | 9/2001 | Miyazaki et al. | 709/201 |
| 2002/0021681 A1 | 2/2002 | Madour | 370/331 |
| 2002/0023174 A1 | 2/2002 | Garrett et al. | 709/245 |
| 2002/0036982 A1 | 3/2002 | Chen | 370/230 |
| 2002/0059114 A1 | 5/2002 | Cockrill et al. | 705/27 |
| 2002/0091802 A1 | 7/2002 | Paul et al. | 709/220 |
| 2002/0138601 A1 | 9/2002 | Piponius et al. | 709/223 |
| 2002/0151312 A1 | 10/2002 | Rosemarijn Bos et al. | 455/452 |
| 2003/0021252 A1 | 1/2003 | Harper et al. | 370/338 |
| 2003/0039237 A1 | 2/2003 | Forslow | 370/352 |
| 2003/0154400 A1 | 8/2003 | Pirttimaa et al. | 713/201 |
| 2003/0187817 A1 | 10/2003 | Agrawal et al. | 707/1 |
| 2003/0217165 A1 | 11/2003 | Buch et al. | 709/229 |
| 2004/0114553 A1 | 6/2004 | Jiang et al. | 370/328 |
| 2004/0162876 A1 | 8/2004 | Kohavi | 709/203 |
| 2004/0162892 A1* | 8/2004 | Hsu | 709/221 |
| 2004/0196821 A1 | 10/2004 | Haddad et al. | 370/349 |
| 2004/0210524 A1 | 10/2004 | Benenati et al. | 705/40 |
| 2004/0259562 A1 | 12/2004 | Madour | 455/452.2 |
| 2005/0002407 A1 | 1/2005 | Shaheen et al. | 370/401 |
| 2005/0025132 A1 | 2/2005 | Harper et al. | 370/352 |
| 2005/0130659 A1 | 6/2005 | Grech et al. | 455/436 |
| 2005/0149651 A1 | 7/2005 | Doak et al. | 710/52 |
| 2005/0176428 A1 | 8/2005 | Gabor et al. | 455/435.1 |
| 2005/0188093 A1* | 8/2005 | Haddad | 709/228 |
| 2005/0195766 A1 | 9/2005 | Nasielski et al. | 370/331 |
| 2005/0201324 A1 | 9/2005 | Zheng | 370/328 |
| 2005/0213606 A1 | 9/2005 | Huang et al. | 370/467 |
| 2005/0220039 A1 | 10/2005 | Hoshino et al. | 370/261 |
| 2005/0278420 A1 | 12/2005 | Hartikainen et al. | 709/203 |
| 2005/0286709 A1 | 12/2005 | Horton et al. | 379/265.09 |
| 2006/0014547 A1* | 1/2006 | Walter | 455/456.1 |
| 2006/0018272 A1 | 1/2006 | Mutikainen et al. | 370/328 |
| 2006/0077924 A1 | 4/2006 | Rune | 370/328 |
| 2006/0116113 A1 | 6/2006 | Gass | 455/414.4 |
| 2006/0126630 A1 | 6/2006 | Shirazipour et al. | 370/392 |
| 2006/0171310 A1 | 8/2006 | Ahluwalia et al. | 370/229 |
| 2006/0251038 A1 | 11/2006 | Tamura et al. | 370/342 |
| 2006/0264207 A1 | 11/2006 | Tamura et al. | 455/415 |
| 2006/0268819 A1 | 11/2006 | Chen et al. | 370/349 |
| 2007/0008882 A1 | 1/2007 | Oran | 370/229 |
| 2007/0036312 A1 | 2/2007 | Cai et al. | 379/126 |
| 2007/0086582 A1* | 4/2007 | Tai et al. | 379/114.01 |
| 2007/0094712 A1 | 4/2007 | Gibbs et al. | 726/3 |
| 2007/0121615 A1 | 5/2007 | Weill et al. | 370/389 |

| | | | | |
|---|---|---|---|---|
| 2007/0121642 A1 | 5/2007 | Battin et al. | | 370/395.2 |
| 2007/0153720 A1 | 7/2007 | Baglin et al. | | 370/328 |
| 2007/0254661 A1 | 11/2007 | Chowdhury et al. | | 455/436 |

FOREIGN PATENT DOCUMENTS

| | | |
|---|---|---|
| WO | WO 99/31610 | 12/1998 |
| WO | WO 2005/107297 | 11/2005 |

OTHER PUBLICATIONS

Draft—TR45—PN-3-4732-RV4 (to be published as TIA-835.2-D), 93 pages.

Draft—TR45—PN-3-4732-RV4 (to be published as TIA-835.3-D), 36 pages.

Draft—TR45—PN-3-4732-RV4 (to be published as TIA-835.4-D), 70 pages.

Draft—TR45—PN-3-4732-RV4 (to be published as TIA-835.5-D), 72 pages.

Draft—TR45—PN-3-4732-RV4 (to be published as TIA-835.6-D), 36 pages.

3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.

3GPP2 X.S0011-001-D, 3rd Generation Partnership Project 2 '3GPP2', "cdma2000 Wireless IP Network Standard: Introduction," Version 1.0, 33 pages, Feb. 2006.

3GPP2 C.S0063-0, 3rd Generation Partnership Project 2 '3GPP2', "cdma2000 High Rate Packet Data Supplemental," Version 1.0, 127 pages, Mar. 2006.

3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.

3GPP2 C.S0024-A, 3rd Generation Partnership Project 2 '3GPP2', "cdma2000 High Rate Packet Data Air Interface Specification," Version 2.0, 1,223 pages, Jul. 2005.

B. Aboba, et al., "Extensible Authentication Protocol (EAP)," Network Working Group, RFC 3748, http://www.ietf.org/rfc/rfc3748.txt, 59 pages, Jun. 2004.

B. Aboba, D. Simon, "PPP EAP TLS Authentication Protocol," Network Working Group, RFC 2716, http://www.ietf.org/rfc/rfc2716.txt, 22 pages, Oct. 1999.

W. Simpson, "PPP Challenge Handshake Authentication Protocol (CHAP)," Network Working Group, RFC 1994, http://www.ietf.org/rfc/rfc1994.txt, 12 pages, Aug. 1996.

W. Simpson, "The Point-to-Point (PPP)," Network Working Group, RFC 1661, http://www.ietf.org/rfc/rfc1661.txt, 47 pages, Jul. 1994.

P. Eronen, et al., "Diameter Extensible Authentication Protocol (EAP) Application," Network Working Group, RFC 4072, http://www.ietf.org/rfc/rfc4072.txt, 29 pages, Aug. 2005.

P. Calhoun, et al., "Diameter Base Protocol," Network Working Group, RFC 3588, http://www.ietf.org/rfc/rfc3588.txt, 129 pages, Sep. 2003.

3rd Generation Partnership Project 2 "3GPP2"; "AII-IP Core Network Multimedia Domain: Service Based Bearer Control- Stage 2;www.3gpp2.org-"; Version 1.0. Draft Version 0.21.0, 49 pages.

PCT Notification of Transmittal of the International Search Report and the Written Opinion of the International Searching Authority, or the Declaration, International Application No. PCT/US07/05847, 9 pages, Oct. 26, 2007.

PCT Notification of Transmittal of the International Search Report and the Written Opinion of the International Searching Authority, or the Declaration, International Application No. PCT/US07/05849, 9 pages, Nov. 14, 2007.

Yegani et al., "System and Method for Access Authentication in a Mobile Wireless Network," U.S. Appl. No. 11/419,382, 20 pps, 3 pps. drawings, (2104), Filed May 19, 2006.

Yegani et al., "System and Method for Handover of an Access Terminal in a Communication Network," U.S. Appl. No. 11/682,735, 24 pps, 3 pps drawings, (2360), Filed Mar. 6, 2007.

Yegani et al., "Enforcement of User Level Policies from Visited Networks in a Mobile IP Environment," U.S. Appl. No. 11/682,817, 22 pps, 2 pps drawings, (2359), Filed Mar. 6, 2007.

Yegani et al, Authentication of Access Terminals in a Cellular Communication Network,: U.S. Appl. No. 11/682,857, 28 pps, 5 pps drawings, (2358), Filed Mar. 6, 2007.

Andreasen et al., "System and Method of Consolidating Accounting Data for a Communication Session," U.S. Appl. No. 11/714,974, 40 pps, 3 pps drawings, (2404), Filed Mar. 6, 2007.

Panda et al., "System and Method for Capturing Accounting Data for a Communication Session," U.S. Appl. No. 11/715,018, (2402), Filed Mar. 6, 2007.

Rosenberg et al., "Determining a Policy Output for a Communication Session," U.S. Appl. No. 11/715,032, 31 pps, 4 pps drawings, (2368), Filed Mar. 6, 2007.

Leung et al., "Communicating Packets Using a Home Anchored Bearer Path," U.S. Appl. No. 11/715,033, 33 pps, 4 pps drawings, (2407), Filed Mar. 6, 2007.

Andreasen et al., "Posture-Based Network Authentication," U.S. Appl. No. 11/715,040, 23 pages, 2 pps drawings, (2398), Filed Mar. 6, 2007.

Iyer et al., "Access Terminal for Communicating Packets Using a Home Anchored Bearer Path," U.S. Appl. No. 11/715,041, 33 pps, 4 pps drawings, (2300), Filed Mar. 6, 2007.

Rosenberg et al., "System and Method for Exchanging Policy Information in a Roaming Communications Environment,"U.S. Appl. No. 11/715,056, 42 pps, 3 pps drawings, (2416), Filed Mar. 6, 2007.

Rosenberg et al., "Establishing Facets of a Policy for a Communication Session," U.S. Appl. No. 11/715,065, 32 pps, 4 pps drawings, (2409), Filed Mar. 6, 2007.

Rosenberg et al., "Performing Deep Packet Inspection for a Communication Session," U.S. Appl. No. 11/715,073, 31 pps, 4 pps drawings, (2400), Filed Mar. 6, 2007.

Rosenberg et al., "Assigning a Serving- CSCF During Access Authentication," U.S. Appl. No. 11/715,074, 22 pps, 2 pps drawings, (2410), Filed Mar. 6, 2007.

Rosenberg et al., "System and Method for Providing Emergency Services in a Visited Communications Environment," U.S. Appl. No. 11/715,111, 39 pps, 2 pps drawings, (2418), Filed Mar. 6, 2007.

Panda et al., "Application-Aware Policy Enforcement," U.S. Appl. No. 11/715,187, 28 pps, 2 pps drawings, (2403), Filed Mar. 6, 2007.

Andreasen et al., "System and Method for Generating a Unified Accounting Record for a Communication Session," U.S. Appl. No. 11/715,210, 46 pps, 3 pps drawings, (2399), Filed Mar. 6, 2007.

Andreasen et al., "Network-triggered quality of service (QoS) Reservation," U.S. Appl. No. 11/715,250, 21 pps, 2 pps drawings, (2405), Filed Mar. 6, 2007.

Andreasen et al.,; "Policy-Based Control of Content Intercept", U.S. Appl. No. 11/715,251, 23 pps, 2 pps drawings, (2401).

Rosenberg et al., "System and Method for Network Charging Using Policy Peering," U.S. Appl. No. 11/715,256, 43 pps, 3 pps drawings, (2415), Filed Mar. 6, 2007.

Online Inc., "Apogee Releases Content Usage-Based Billing Product Annotated Title—Software allows content usage-based billing," EContent, vol. 24, No. 5, NDN 173-0356-6509-7, 1 pg. Jul. 2001.

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs., Jan. 1998.

Business Wire, "Apogee Networks Introduces Industry's First Content Usage-Based Billing Solution for Web Hosters," NDN 219-0281-6988-1, 2 pgs., May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs. Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.

Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs., Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.

Business Wire, "Apogee Networks Joins Content Alliance; Billing Expert to Join Industry Group Aimed At Advancing Content Networking," NDN 218-0181-2716-7, 3 pgs., Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs., Jun. 19, 2000.

Ylitalo, et al., *Re-thinking Security in IP based Micro-Mobility*, downloaded from www.tcs.hut.fi/Studies/T-79.5401/2005AUT/ISC04-Vlitalo-e-al.pdf (12 pages).

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages.

PCT Notification of Transmittal of the International Search Report and the Written Opinion of the International Searching Authority, or the Declaration with attached PCT International Search Report and Written Opinion of the International Searching Authority in International Application No. PCT/US2006/046800, (10 pgs), Nov. 10, 2008.

\* cited by examiner

SYSTEM AND METHOD FOR DETERMINING A NETWORK FOR PROCESSING APPLICATIONS FOR A COMMUNICATION SESSION

CROSS-REFERENCE TO RELATED APPLICATION

This Application claims priority under 35 U.S.C. §119 of provisional application No. 60/780,176 filed Mar. 6, 2006, entitled VERIZON WIRELESS MULTI-MEDIA PLUS (MMD+) PROGRAM SYSTEM ARCHITECTURE DOCUMENT. This Application also incorporates by reference that Provisional in its entirety.

TECHNICAL FIELD OF THE INVENTION

This invention relates in general to the field of communications and, more particularly, to a system and a method for exchanging policy information in a roaming communications environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic and the individualistic needs of new end users.

As the subscriber base of end users increases, proper routing and efficient management of communication sessions and data flows becomes even more critical. One significant area for any group of end users relates to peering. The problem is particularly troubling in mobile service provider network architectures, where devices can roam from network to network.

Thus, designing an effective network response for roaming users provides a significant challenge to component manufacturers, system administrators, and network operators.

SUMMARY OF THE INVENTION

From the foregoing, it may be appreciated by those skilled in the art that a need has arisen for an improved communications approach that provides for an optimal response for one or more end users roaming in a network environment. In accordance with one embodiment of the present invention, a system and a method for providing an optimal information exchange in a communications environment are provided that greatly reduce disadvantages and problems associated with conventional network routing techniques.

According to one embodiment of the present invention, an architecture for selecting an IP address for an application used in a network environment is provided. Home policy server may receive data of a network's capabilities. Home policy server may also receive data of a subscriber's applications. Home policy server may also receive data of a subscriber's needs. Home policy server can generate a policy document, such that the policy document associates an IP address with each application based on the subscriber's needs and the network's capabilities.

In more particular embodiments, home policy server can send the policy document to access terminal. Additionally, the home policy server can dynamically generate a second policy document to replace the first policy document if network capabilities change.

Some embodiments of the present invention may provide a number of technical advantages. For example, according to one embodiment of the present invention, a communications approach is offered that provides more efficient and better usage of visited network when visited network meets capability requirements of subscriber's needs for a particular application. This in turn provides a better service for subscriber, such as providing better latency.

Another potential advantage of certain embodiments of the present invention is that the proposed architectures enables home provider to be flexible in using home network or visited network at home network's discretion, based on the needs of the subscriber Communication system allows the decisions to vary based on the visited network and vary over time, as needed. Other advantages are discussed below with reference to specific example call flows.

Note that certain embodiments of the present invention may enjoy some, all, or none of these advantages. Other technical advantages may be readily apparent to one skilled in the art from the following figure, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
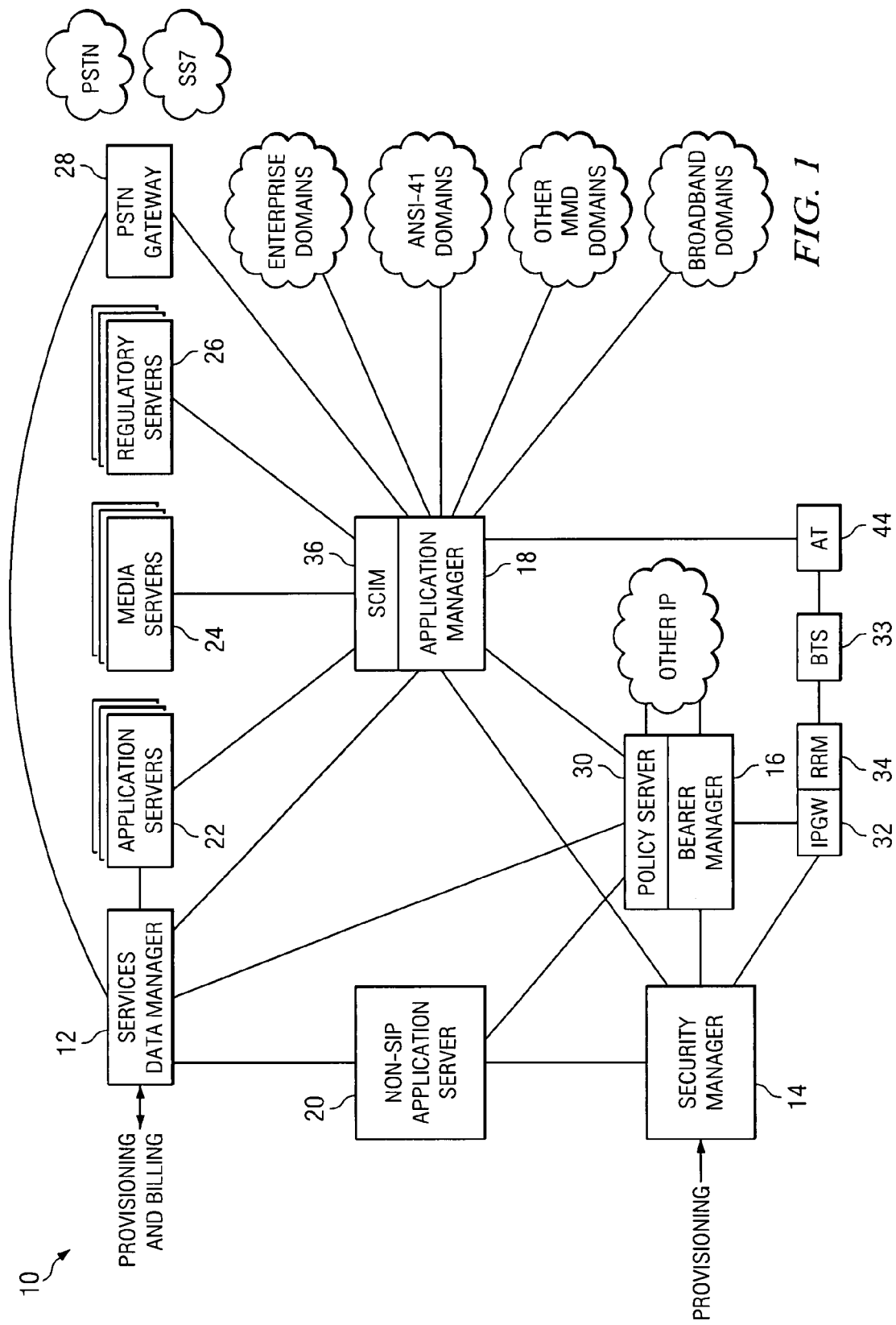
FIG. 1 is a simplified block diagram of a communications system for exchanging policy information in a communications environment in accordance with one embodiment of the present invention.

FIG. 1 is a simplified block diagram of a communications system 10 for communicating data in a network environment and, further, for providing an effective policy peering protocol for a group of end users that may potentially roam between networks. Communication system 10 includes a services data manager 12 to which provisioning and billing flow. A security manager 14 is also included in the system, as it is also tasked with provisioning. In addition, communication system 10 includes a bearer manger 16 (coupled to a policy server 30), an application manager 18 (coupled to a Service Capabilities Interaction Management (SCIM) element 36), a non-SIP application server 20, a group of application servers 22, a group of media servers 24, a group of regulatory servers 26, and a PSTN gateway, which is coupled to services data manager 12. Also included in communication system 10 are an IP gateway (IPGW) 32, a radio resource manager (RRM) 34, a base terminating station (BTS) 33, and an access terminal (AT) 44. A number of clouds are also depicted in FIG. 1, illustrating the various possible connectivity characteristics of the system.

FIG. 1, in this mobile network example, may be generally configured or arranged to represent a communication architecture, e.g., a 2.5G network applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communications system 10. For example, communications system 10 may cooperate with any version of a GPRS tunneling protocol (GTP) that includes application operations. This may be inclusive of first generation, 2G, and 3G architectures that provide features for application distribution. In another example, communications system 10 may cooperate with the Point-to-Point Protocol (PPP) that supports xDSL architectures providing features for application distribution.

In accordance with one embodiment of the present invention, communication system 10 uses policy peering to determine whether AT should access home or visited anchor, on an application-by-application basis. The decision is based on the capabilities of the visited network, which are communicated during initialization of the policy peering. Home network will also consider subscriber's needs (in terms of network treatment) in selecting either home anchor or visited anchor for a particular application.

By implementing such a paradigm, communication system 10 provides more efficient and better usage of visited network when visited network meets capability requirements of subscriber's needs for a particular application. This in turn provides a better service for subscriber, such as providing better latency.

Communication system 10 is also advantageous because it enables home provider to be flexible in using home network or visited network at home network's discretion, based on the needs of the subscriber Communication system allows the decisions to vary based on the visited network and vary over time, as needed. Additional details related to specific flows are provided below with reference to FIGS. 2-3. Before turning to those discussions, however, some background information about the infrastructure of communication system 10 is offered for purposes of teaching. Following this brief description, existing systems are discussed in an effort to further explain some of the problems inherent to current networking architectures.

Access terminals (or ATs) are normally mobile devices, but the architecture provides for fixed device access as well. The terminals can access the network through a high-speed wireless data network, providing them with suitable IP connectivity. ATs can also access the network through CDMA or alternative mechanisms, such as WiFi or even 1×RTT data. In the case of EVDO Rev A, the RAN includes the RRM and the BTS. The RAN is responsible for providing layer-2 mobile access, Quality of Service (QoS) on the access network, mobility functions, and handoff services within the area of coverage for a particular RAN.

The RAN interfaces with the IPGW, which is the first IP component in the network. Its job, as the name implies, is to act as a gateway between the layer-2 RAN access and the IP layer-3 network. The IPGW is responsible for authentication of the mobile to the network. It accomplishes that through an EAP exchange with the mobile and the SM, which holds the keys. IPGW performs communications with the RAN using the A10, A11, and A12 interfaces defined in CDMA, handoff functions between RAN and between IPGW, and for facilitating registration of the mobile to the IP network, using Mobile IP v6 (MIPv6). MIPv6 is used as the primary mobility technology at layer-3, although the architecture does not change in any fundamental way with IPv4. The IPGW is also responsible for accounting and QoS functions for the packets it forwards.

Though the interfaces from the IPGW towards the RAN are RAN-specific, the interfaces from the IPGW towards the rest of the network are not. This allows for IPGWs to be deployed whose access networks are based on other technologies, such as WiFi. Because the IPGW performs functions such as authentication, handoff, and context transfer in ways that are not access network specific, the network allows for roaming and handoff functions seamlessly across these different access network technologies.

Through the mobile IP registration procedures, the mobile can be connected to the Bearer Manager (BM), which acts as the IP anchor point and MIPv6 Home Agent (HA). Because of its role as the IP anchor point, the BM also serves as the natural enforcement point for a host of network policies, including QoS, accounting, and mobility. The BM also provides security functions, such as firewall, intrusion detection, and DDoS attack prevention. The BM provides Deep Packet Inspection (DPI) functions, which allow for detection of application layer traffic passing through the BM. The BM also acts as a repository for network presence, including the roaming states for the mobile, its cell site location, etc.

Co-resident with the BM is the Policy Server (PS), which is sometimes referred to as the Policy Manager (PM). The PS is responsible for implementing the operator policies that govern the way in which the underlying IP network (the IPGW, BM, and RAN) is utilized in support of the applications that run on top of the network. To do that, the PS controls the BM and IPGW by providing it with policies, called facets, which the BM and IPGW execute. The PS is contacted by numerous elements in the network for decisions on how they should proceed, in cases where such decisions impact the underlying use of the IP network.

Since one of the primary purposes of the network is to support mobile voice services, the Session Initiation Protocol (SIP) plays a prominent role in the architecture. SIP is used between the mobile and the Application Manager (AM), which acts as the main SIP server in the network. The AM is responsible for basic SIP functions, such as SIP registration and SIP call routing. The AM provides the basic set of voice features, such as call forwarding and call screening. It is responsible for authorizing SIP calls to and from endpoints, and routing those calls to the right terminating component, whether it be another AM, a gateway to the PSTN, or a peer operator. The AM can use ENUM to facilitate the routing of calls between providers, and leverages configured routing tables to route calls to the PSTN. The AM is responsible for invocation of SIP-based application servers, which can provide services like IP centrex and Push-To-Talk. These application servers reside on top of the AM, and are accessed using the IMS Service Control (ISC) interface. The AM provides Service Capabilities Interaction Management (SCIM) functions, which perform feature interaction management amongst its internal features and ones invoked in application servers. The AM also interacts with the PS over a DIAMETER interface, informing it of SIP session requests so that the network can be properly configured to support those sessions. The AM also provides user presence services through SIP for Presence and Messaging Leveraging Extensions (SIMPLE). Communication system 10 supports two different types of applications. One type is SIP-based applications. These application servers (AS) reside on top of the AM, using the ISC interface, and are invoked using SIP-based interactions. Communication System 10 also supports non-SIP applications. These applications are invoked directly by the AT (or through other triggers). However, access to these applications and coordination of underlying network resources in support of those applications is managed by the PS, to which the application server communicates. Indeed, the communications interface between the non-SIP AS and the PS is identical to the one between the AM and PS and can be based on DIAMETER.

Application servers can frequently need access to media processing functions, such as Interactive Voice Response (IVR), mixing functions, and messaging functions. Rather than have each application server implement these functions separately, they are extracted into a common set of servers, called media servers. These media servers represent coarse-grained application components that are not useful applications by themselves, but are useful when used by other applications. These servers are also known as service enablers.

Nearly all of the components in the network interface to the Security Manager (SM), also using a DIAMETER application, for example. The SM is the central access point for security services in the network. Authentication at all layers takes place through interactions with the SM, since the SM acts as the central repository and generation point for keying materials. The SM is the core of the Security Operations Center (SOC), Which provides continuous management of threats in the network. The SM coordinates with the rest of the network to provide intrusion detection, network infrastructure security, establishment of traffic baselines, anomaly detection, etc. The SM owns the security policy for the network, pushing that security policy to various components, separately from the PS. This provides a clean separation between security and functional policies. The SM also performs posture assessment on mobiles, determining whether they can be permitted on the network, and with access to which services, based on the compliance of the mobile to standards for software compliance (such as OS versions, anti-virus versions, etc.).

The Services Data Manager (SDM) acts as the central repository of subscriber data in the network. All components needing access to subscriber data, including AM, PS and application servers, obtain this data from the SDM, also using a DIAMETER application. Since numerous protocols and devices are used in the network, each with potentially different identifiers, the SDM acts as the repository for the subscriber data model, and is able to relate together the various identifiers used within the system. The SDM provides basic Create/Read/Update/Delete (CRUD) services on the data, and is responsible for highly reliable storage of the data. Caching is used extensively and SDM is responsible for providing network elements of updates to the data so that caches can be updated or invalidated. The SDM also serves as the repository of accounting records for subscriber usage on the network. These records are read by back-end billing systems for correlation and billing. The SDM also stores various pieces of non-subscriber data, such as PSTN routing logic. Provisioning systems interface with the SDM, pushing subscriber data into it and reading it out.

Interconnection with the PSTN is accomplished through traditional SIP-based PSTN gateways, whether composed or decomposed. The regulatory server provides an interface for installation of intercept orders from law enforcement agencies, and the collection of data from the network for delivery to law enforcement agencies.

Turning now to some of the problems that are being solved by the present invention, in current architectures, a key design issue is the placement of the anchor point. The anchor point is a fixed server somewhere in the network to which packets destined for a mobile device are delivered. As a user moves around, they update their attachment to this anchor, so that packets are forwarded to their new care-of-address. In mobile IP, the anchor is the Home Agent (HA).

When considering roaming architectures, an important problem is where the anchor should be located—the home or the visited network. Each has benefits. If the anchor is in the visited network, it means that the user will see lower latency and packet loss for the packets they receive, which is good for applications, such as real-time VoIP. However, if the anchor is in the home network, the home provider will be able to apply custom billing treatment, firewalling, filtering, etc., giving the home provider greater control. This is good for other applications, such as web browsing.

Up until now, the choice has been a fixed property of the network because the anchor was either in the home or the visited network, period. System 10 allows AT to utilize two anchors. This means that AT can use the visited network for some applications, and the home network for other applications. However, an important problem still remains of how the home provider determines whether AT should use the visited anchor or the home anchor for a particular application.

Communication system 10 addresses these problems, as well as others, in providing a generic solution to the problems cited above. In essence, communication system 10 learns about capabilities of visited network during initialization of policy peering. Communications system 10 then learns which visited network a user is in during the registration process for that user. Communication system 10 determines whether to use visited anchor or home anchor based on visited network's capabilities, subscriber's needs, and the particular application being used. Details about the proposed architecture are outlined below with reference to FIGS. 2 and 3.

Figure 2:
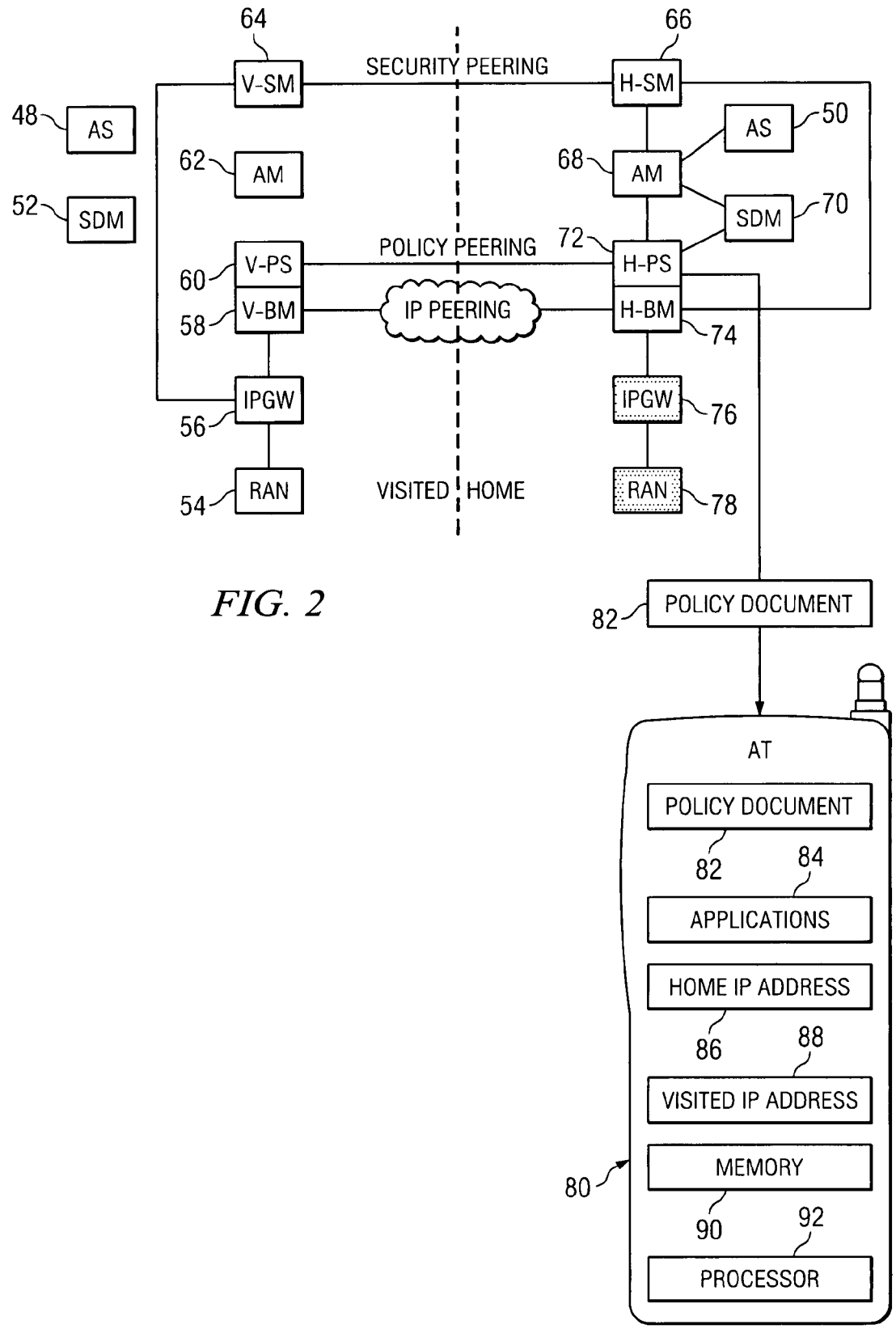
FIG. 2 is a simplified block diagram illustrating a more comprehensive example implementation of one potential embodiment of the present invention.

FIG. 2 is a simplified block diagram illustrating additional details associated with an example roaming architecture and, further, offers a simple arrangement according to the teachings of one embodiment of the invention. FIG. 2 depicts another example environment in which the present invention can operate. This FIGURE is slightly more comprehensive and, accordingly, includes a number of components that are not necessarily required to implement the present invention.

FIG. 2 includes a home and a visited network. Therefore, FIG. 2 often includes similar components residing in each network, such as: services data managers 52, 70, RANs 54, 78, IPGWs 56, 76, home bearer manager 74, visited bearer manager 58, and home policy server 72 and visited policy server 60, which execute policy peering. FIG. 2 further includes security managers 64, 66 that perform security peering, application managers 62 and 68, application servers 48 and 50, and a mobile AT 80. Mobile AT 80 includes policy document 82, applications 84, home IP address 86, visited IP address 88, memory 90, and a processor 92.

Software and/or hardware may reside in mobile AT 80 and/or policy servers 60, 72 and/or bearer managers 58, 74 in order to achieve the teachings of the features of the present invention.

Note that, due to their flexibility, these components may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate' the operations thereof. Considerable flexibility is provided by the structure of policy servers 60, 72 and/or bearer managers 58, 74 and/or AT 80 in the context of communications system 10 and, accordingly, they should be construed as such.

It should be noted that the internal structure of the system of FIG. 2 is versatile and can be readily changed, modified, rearranged, or reconfigured in order to achieve its intended operations or additional operations. Additionally, any of the items within FIGS. 1 and 2 may be combined, where appropriate, or replaced with other functional elements that are operable to achieve any of the operations described herein.

Home bearer manager 74 and visited bearer manager 58 act as home anchor and visited anchor, respectively. When subscriber turns on AT 80 in visited network, AT 80 gets assigned visited IP address 88 in visited network by visited bearer manager 58. Subscriber also gets home IP address 86 assigned by home bearer manager 74. In both of these cases, there is interaction between home policy server 72 and visited policy server 60.

System 10 also includes home policy server 72 and visited policy server 60. When the two policy servers initially connect, they perform an exchange of capability information through policy peering. This capability exchange allows the home network to learn what the network processing capabilities of the visited network are, in terms of facets, which are primitive policy operations. Facets include policy operations, such as quality of service treatment, packet filtering, deep packet inspection, firewalling, and mobility features, etc.

After the capability exchange takes place, home policy server 72 has information for policies that the visited network can properly execute. In addition, home policy server 72 also knows who its subscribers are, what applications 84 they have, and what the required network treatment is for each application. For example, one user might have a 'secure web browsing' application 84, which requires network firewalling of packets based on destination IP. Another user might have a VoIP application 84, which requires other unique capabilities of a network.

As part of the registration process, when subscriber turns on AT 80 in visited network, AT 80 gets assigned visited IP address 88 in visited network by visited bearer manager 58. Subscriber also gets home IP address 86 assigned by home bearer manager. In both of these cases, there is interaction between home policy server 72 and visited policy server 60. As part of this process, both policy servers exchange information about the types of policies and the types of bearer manager capabilities for each network. This is of particular interest to home policy server 72 that controls policy document 82 that ultimately guides AT 80 as to which IP address it will use for each application 84. When a user for a particular mobile AT 80 registers in a visited network, the home network is made aware of the registration. Based on the identity of the subscriber, the identity and capabilities of the visited network, and the applications 84 used by that subscriber, the home policy server 72 determines whether or not the visited network has sufficient functionality to handle each particular application. Home policy server 72 generates policy document 82, such as a configuration file, for the subscriber. Policy document 82 informs mobile AT 80 what IP address (such as IP address for home bearer manager or IP address for visited bearer manager) to use for each particular application 84 on AT 80. Where the AT 80 is located at a given time can also be included in policy document 82 to help determine which IP address to use for each application 84. Home policy server 72 is operable to send policy document 82 to mobile AT 80.

Mobile AT 80 is operable to receive, store, and utilize policy document 82. AT 80 gets assigned home IP address 86 by home bearer manager 74 for home network and visited IP address 88 by visited bearer manager 58. When an application 84 on mobile AT asks for a port to be allocated, the underlying operating system determines which application 84 is making the request, and then compares application 84 with the configured data in policy document 82. Policy document 82 essentially tells AT 80 which IP address to use for each particular application 84. Operating system selects either home interface for home bearer manager or visited interface for visited bearer manager for allocation of the port. This allows the choice of anchor (home bearer manager 74 or visited bearer manager 58) to change dynamically for each application 84 as AT 80 roams into and out of different networks, based on the capabilities of that network. For example, if subscriber requires secure web browsing, and the visited network has firewalling capabilities, then the visited anchor can be used. The firewall rules will be sent to visited network and downloaded to the visited network as policies when the user connects to the network. However, if visited network does not support these firewalling policies, then home network will be used so that home network can provide the firewalling. In another example, if a SIP call occurs in a visited network, then policy should determine that applications 84 associated with a SIP call, such as media streams, should use visited IP address 88 since subscriber wants as little delay as possible for receiving the media streams.

Home policy server 72 can generate new policy documents 82 to be downloaded to AT 80 as AT 80 is roaming around. For example, new policy documents 82 can be generated as AT 80 roams into different providers. New negotiations during policy peering will take place between policy servers, and a new policy document 82 will be downloaded to AT 80. New policy documents 82 can also be generated when AT 80 is roaming into different types of access networks for a particular provider. For example, different bandwidths may be available depending on the type of access network. AT 80 may roam into a high bandwidth environment, and as a result the home policy server 72 could download policy document 82 to AT 80 stating it is ok to use some of the high bandwidth applications in the home network. Other types of access networks may have different charging rules associated for the provider, and home policy server 72 might force traffic to come back to it. Home policy server 72 can generate new policy documents 82 and send to AT 80 whenever policy server 72 becomes aware of a change.

Policy document 82 can include any type of information that may be relevant for AT 80 to make decision on which network to access for each application. Policy document 82 can be in any format that is compatible with being read by AT 80.

In regards to mobility, the policy server can make many decisions and install various facets related to mobility. Some of the decisions made by the PS include Roaming Authorization. When a subscriber roams, the PS can decide if the roaming operation is allowed. This can be based on the roaming partner, applications running for the subscriber, etc. A roaming authorization decision is made at the time of a MIP registration, at which point the BM can ask the PS for a decision. Roaming policies can also be outsourced via facets installed into the BM at registration time.

The Mobility facets include Roaming. For example, instead of making a decision on roaming events as a subscriber moves, the policy server can compute a roaming facet and hand it to the BM. The roaming facet specifies, based on the identity of the roaming partner, whether or not roaming is permitted. Roaming facets can be used only when roaming decisions do not require any knowledge except for the identity of the roaming partner (and the subscriber identity of course).

Policy contexts are the set of states that the policy server uses to make decisions. A policy context can be thought of as a set of variables that the policy rules can check through comparisons (equality, greater-than, not-equal-to, etc.). There are generally two types of policy contexts: local or remote. A local policy context is a policy context that is actively stored and maintained by the PS. Events passed to the PS through questions from elements, or through simple event reports, update these policy contexts. Examples of local policy contexts include the set of SIP applications currently running (passed to the PS from the AM when it asks about proceeding with an application), the roaming network in which a subscriber resides (passed to the PS from the BM during MIP registration), and the time of day. Remote policy contexts are variables that, for various reasons, are not stored on the PS, but that the PS can "read" by doing a query to fetch the current value. One example of such a variable is the admission decision made in the RAN for a QoS request from the subscriber. These QoS requests are processed locally at the RAN, and the results told to the IPGW. They are not passed to the PS unless the authorization envelope has been exceeded. Another is the mode of the mobile, active or dormant. This information is also not normally passed to the policy server, unless an explicit request has been made by the PS to be informed of these changes. Much like configuration, policy contexts span mobility, access and connectivity, QoS, DPI, and accounting. They also include security and application policy contexts.

Mobility policy contexts can include Roaming Network Identity, which is the identity of the visited network provider. This is a local policy context, and is learned through both the access network login and the MIP registration process, where it is passed to the PS from the SM and BM respectively. The policy contexts can also include location. The location of the subscriber can be expressed as the serving IPGW and the serving cell identifier. The location helps in handling policies, which could indicate, whereby certain applications may be allowed only in certain regions for the subscriber. This is passed to the BM during MIP registrations, and made available to the BM. The policy contexts can also include Subscriber Mode: active, idle, or dormant, out of coverage. This is a context that is learnt via periodic updates about the subscriber.

Access policy contexts include Access Technology: the underlying technology used by the mobile, whether it is WiFi, 1×RTT, EVDO or others. This can be learned from the IPGW.

The location information regarding a subscriber can be structured into several parameters: the visited network, the region, the serving cell-identifier, the access-network type, and the geographic location of the subscriber in latitude/longitude. Information such as the cell-identifier is generally available and may be used towards the location of the subscriber, but it is very dependant on the cell size, the radius of coverage. The physical location information can be improved by additional techniques. The physical location of the subscriber depends on the type of device as well as the technology to identify the exact location. The location retrieval can occur via GPS enabled devices, or using network based techniques. GPS enabled devices can be queried to report the GPS information, and this information can be available regardless of the type of access (EVDO, WiFi, fixed network).

A location application can obtain information in two ways: by querying a mobile client directly, or by requesting the network. The location application can query GPS enabled devices directly to report the location information. In the absence of this information or to assist the information received via GPS, network based techniques can also be used. Network based techniques such as AFLT can be performed by the RAN, and this information can be reported to the network/location presence server in the BM. The location application can query the network/location presence server in the BM to request the location information for a given subscriber. The BM in turn sends this query to the RAN via the IPGW and obtains triangulation-based results for a subscriber. This information is then returned to the location application, along with additional network presence information.

The Bearer Manager can provide an open interface over which location, such as cell site for example, and presence information is made available.

Before turning to an example flow for communication system 10 in a given network, some preliminary information about a typical roaming protocol is provided. It is imperative to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

When a user roams, some of the components of the architecture "split." For each split component, some processing is being contributed by an instance of that component in the visited network, and some processing is being contributed by an instance in the home network. In communication system 10, the BM/PS and SM are split. The IPGW resides entirely in the visited network, and the SDM and AM reside entirely in the home network. In some cases, there may be local services provided in the visited network; those would involve the usage of an application server that resides entirely in the visited network.

The basic roaming procedure is as follows. The AT connects to the RAN in the visited network, and connects to its IPGW as its point of attachment. The IPGW proceeds to authenticate the AT using EAP procedures. The IPGW passes the identity asserted by the mobile to the Visited SM (V-SM). The V-SM has no relationship with the subscriber. However, the identity of the subscriber is of the form user@domain. As such, the V-SM uses the domain part of the identifier to locate an SM in the home domain of the subscriber (the H-SM). This H-SM can either directly authenticate the client, and if not (because the client is served by a different H-SM), it can route the messaging to the correct H-SM. Authentication then proceeds as normal. At the end of the exchange, the IPGW knows the identity of the device, and if the device is integrated, of the subscriber. The EAP exchange can also provide the IPGW with the identity of several key services in the home network, including the BM and AM assigned to the subscriber in the home network.

At this point, the client obtains an address in the visited network. This is obtained by the client using DHCP. The IPGW, on receipt of the DHCP query, uses ProxyMIP, and obtains an IP address from a V-BM. The IPGW selects a V-BM based on visited network policies. Since the visited network has no relationship with the subscriber, those policies are never subscriber specific. Once the IPGW obtains an address from the V-BM, this address is then provided to the AT in the DHCP response. The AT then proceeds with mobile IP procedures to obtain an address from the home BM. The AT can register its visited address (which it obtained via DHCP) as the point-of-attachment to the home BM. The MIP procedures require the mobile (in the case of IPv6) or the IPGW (in the case of IPv4) to provide the address of the H-BM. This identity was passed to the IPGW during the EAP authentication process, and then passed to the mobile in the DHCP reply The V-BM can also pass other bootstrapping parameters to the AT in the DHCP reply. For example, the address of a configuration server for learning local dial plans is provided in the DHCP reply.

By registering the visited address as the point-of-attachment, the bearer path towards the home BM can include the V-BM. This has the benefit of hiding mobility within the visited network from the home BM. MIP binding updates may not be needed until the AT moves to a different provider network entirely. This localization of mobility improves the performance of the network and reduces the load on the BM.

The H-BM can authenticate the mobile IP registration. That authentication can, for integrated clients, be based on keys derived from the EAP authentication; otherwise, it is based on a shared secret provisioned into the device for purposes of MIP authentication. In either case, the H-BM interacts with the H-SM to authenticate the MIP registration.

Both the V-BM and H-BM can contact their respective policy servers to obtain policies that apply to the subscriber. Obtaining these policies involves the usage of policy server peering.

Once the MIP registration is completed, the mobile proceeds with SIP registration. The SIP REGISTER message is sent directly from the AT to the AM, which resides in the home network. The AT can know the AM address as a consequence of DHCP. If the AT is not integrated, its AM is known through configuration, since the AM is statically assigned to the subscriber. These procedures are equally applicable to IPv6 (in which case MIPv6 and PMIPv6 are used) and IPv4 (in which case PMIPv4 is used).

With regards to the roaming procedures, for Mobile IPv6, as part of the access authentication process, the Home Bearer Manager address is provided to the IPGW by the H-SM. The client receives a Visited Address via a DHCP exchange with an IPGW associated with its point of attachment. The assigned address is taken from a subnet that is 'homed' on a bearer manager in the same region as the IPGW where the client is attached. The Visited Bearer Manager is chosen based on regional configuration in the visited network. This address is termed the Visited Address. It is this address that is used as the Care of Address when establishing a mobility binding with a Home Bearer Manager.

Prior to informing the device of the Care of Address and the Home Bearer Manager, Proxy MIPv6 procedures are used to establish a bidirectional tunnel between the Visited Bearer Manager and the IPGW. This allows the Visited Bearer Manager to forward traffic destined to a given Care of Address via the correct IPGW. As a client's point of attachment changes, Proxy MIPv6 procedures are used to re-register the client via the new point of attachment.

When the PMIPv6 procedures are complete, the DHCP response, containing the Visited Address, Home Bearer Manager address, and home AM address is sent to the client. The IPv6 client then initiates a MIPv6 binding with the Home Bearer Manager. The Care of Address supplied in the MIPv6 Binding Request is the address assigned to the client by the Visited Bearer Manager. This binding initiation is routed to the Home Bearer Manager via the Visited Bearer Manager. The Home Bearer Manager authenticates the subscriber identifier with the H-SM. Successful authentication results in the Home Bearer Manager sending a Binding Acknowledgement and assigning an IPv6 address to the client from a subnet 'homed' at the Home Bearer Manager. Subscriber policy can be fetched at this time.

As the Care of Address is owned by the Visited BM, the binding response can be routed to the Visited BM from the Home BM. The previous PMIPv6 sequence ensures that the Visited BM can forward the Binding Acknowledgement to the client via the correct IPGW.

The device now has an IPv6 address assigned by the Home Bearer Manager and an IPv6 Care of Address associated with the Visited Bearer Manager. A tunnel exists between the Visited Bearer Manager and the IPGW to ensure that the Visited Bearer Manager can 'see' the bearer and control paths and can enforce visited network policy. For Mobile IPv4, the steps taken are very similar to those for the IPv6 client. Indeed, it is an objective of the design that the architecture not fundamentally differ between v4 and v6. A Home Bearer Manager for the client is assigned as part of the Access Authentication procedures. A visited address is assigned using DHCP procedures, a tunnel is established between the IPGW and Visited Bearer Manager using Proxy registration techniques and then a mobility binding established between the client and a Home Bearer Manager, Similar to the IPv6 case, DHCP is used for visited address assignment.

The authentication steps are identical to those for MIPv6. Following successful access authentication, a Proxy Registration establishes a mobility binding with the Visited Bearer Manager on behalf of the client. The Visited Bearer Manager is chosen based on regional configuration. The Visited Bearer Manager assigns an IP address to the client, this being returned to the IPGW as part of mobility binding establishment.

The AT sends a DHCP Discover message to the IPGW, and the Visited Address is provided to the client in a DHCP Acknowledgement message. The DHCP acknowledgement can also contain the Home BM address and the home AM address. The Visited Bearer Manager sends a Foreign Agent Advertisement to the client via the IPGW.

The receipt of the Foreign Agent advertisement informs the client that the Foreign Agent for MIPV4 registration can be the V-BM. The client sends a MIPv4 Registration Request containing the Subscriber ID to the V-BM via the IPGW. The Registration Request is addressed to the V-BM. The Home Agent address field contains the address of the Home Bearer Manager identified in the DHCP Acknowledgement.

The V-BM, functioning as a MIPv4 Foreign Agent, sends the Registration Request to the Home Bearer Manager. The Care-of-Address in the MIPv4 Registration Request is the address of the Visited Bearer Manager. As the client has been assigned an address for which the Visited Bearer Manager acts as the Foreign Agent, all packets destined to the client traverse the Visited Bearer Manager. Hence, visited network policy can be applied at the Visited Bearer Manager. All traffic sent from the client is sent to the Visited Bearer Manager via the tunnel established between the IPGW and Visited Bearer Manager using the Proxy Mobility Registration procedures described above. This ensures that all traffic from the client is subject to visited network policy.

Layer-3 authentication of the Subscriber based on the subscriber ID is performed at the Home Bearer Manager, where a Home Address is assigned. The Home Address is returned in the MIPv4 Registration Reply, and that reply is sent to the Care-of-Address contained in the MIPv4 Registration Request. The Registration Reply is sent to the IPGW from the visited Bearer Manager and forwarded to the client. As a result of the Registration Request/Reply exchange, a path is established between the Home Bearer Manager and the Client. This path comprises a sequence of fixed paths, a Home Bearer Manager-Visited Bearer Manager path, the Visited Bearer Manager-IPGW path and the IPGW-Client path.

Figure 3:
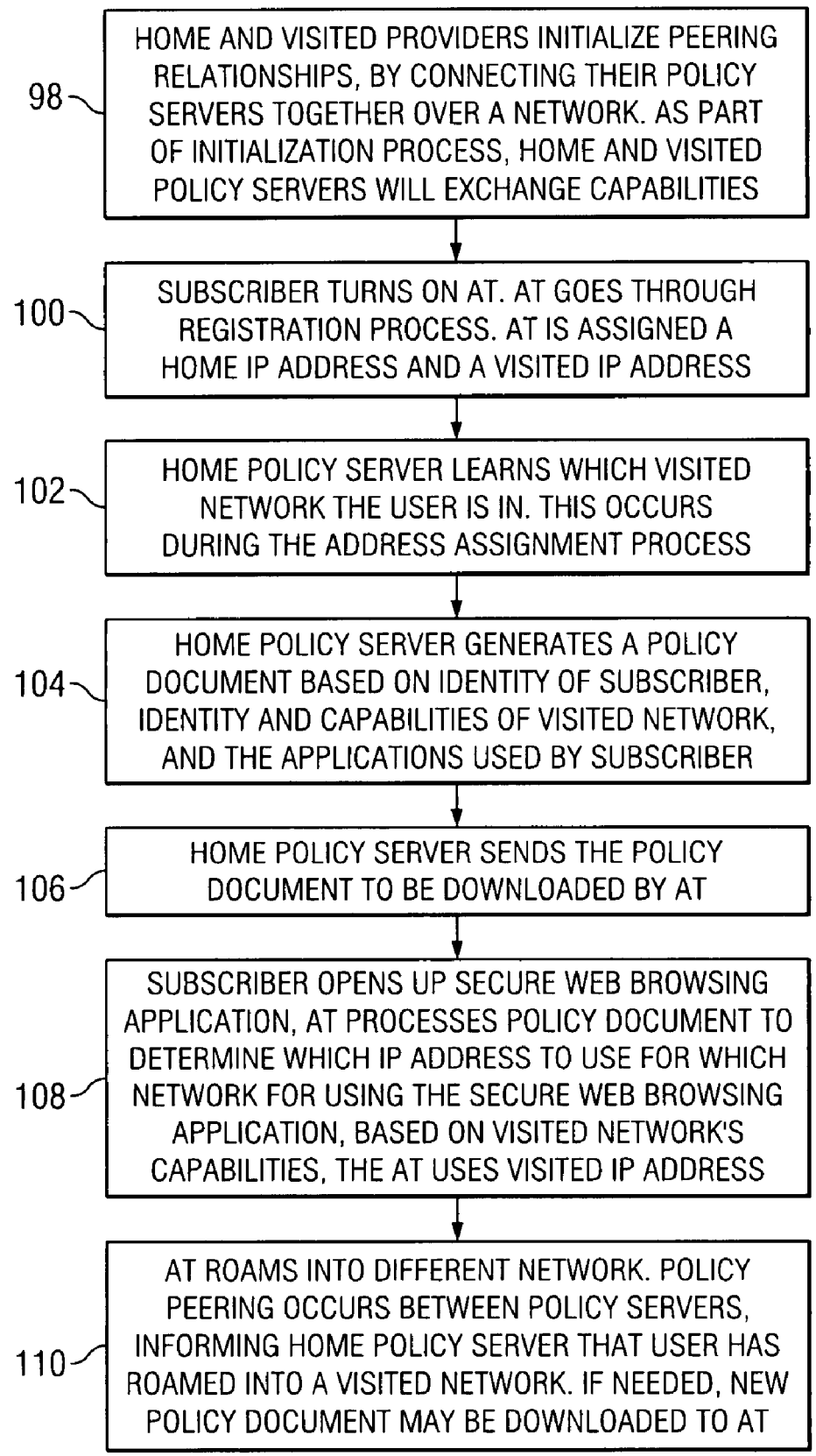
FIG. 3 is a simplified flowchart illustrating a simple flow according to the teachings of one embodiment of the invention.

The device has an IPv4 address assigned by the Home Bearer Manager and an IPv4 Visited Address associated with the Visited Bearer Manager. A tunnel exists between the Visited Bearer Manager and the IPGW to ensure that the Visited Bearer Manager can 'see' the bearer and control paths and can enforce visited network policy Turning now to the features of the present invention, FIG. 3 is a simplified flowchart that addresses a basic example of a simple flow for one embodiment of the present invention. The flow begins at step 98 when the home and visited providers initialize their peering relationships. They do this by connecting their policy servers together over a network. As part of the initialization process, the home and visited policy servers will exchange capabilities. When the user turns on AT in visited network at step 100. As part of the registration process, AT 80 gets assigned visited IP address 88 in visited network by visited bearer manager 58. Subscriber also gets home IP address 86 assigned by home bearer manager. In step 102, home policy server learns which visited network the user is in. This happens as part of the address assignment process. This is of particular interest to home policy server 72 that controls policy document 82 that ultimately guides AT 80 as to which IP address it will use for each application 84.

At step 104, home policy server generates policy document 82 based on the identity of the subscriber, the identity and capabilities of the visited network, and the applications 84 used by that subscriber. The generated policy document 82 is based on whether or not the visited network has sufficient functionality to handle each particular application. At step 106, home policy server sends policy document to be downloaded by AT.

At step 108, subscriber opens up secure web browsing application. AT checks policy document to see whether home IP address or visited IP address should be used for secure web browsing application. In this example, assume the visited network has firewalling capabilities so policy document determined that the visited anchor could be used so AT uses visited IP address.

At step 110, AT roams into a different network. New negotiations during policy peering will take place between policy servers, informing home policy server that the user has roamed into a new visited network. New policy document 82 may be downloaded to AT 80 if needed.

Some of the steps discussed with reference to FIG. 3 may be changed or deleted where appropriate and additional steps may also be added to these process flows. These changes may be based on specific communication architectures or particular interfacing arrangements and configurations of associated elements and do not depart from the scope or the teachings of the present invention.

Although the present invention has been described in detail with reference to particular embodiments, communications system 10 may be extended to any scenario in which end user 12 is provided with call options in the context of a wired or a wireless connection or coupling. This may also be extended to any other network signaling protocols to achieve the teachings of the present invention.

Moreover, significant flexibility is provided by communications system 10 in that any suitable one or more components may be replaced with other components that facilitate their operations.

Additionally, although described in specific environments and contexts, the present invention could be used in countless applications. Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. A method for selecting a network for an application used in a network environment, comprising:
    receiving data, at a server, associated with a first network;
    receiving data, at the server, associated with a second network;
    receiving data, at the server, associated with a plurality of applications associated with an access terminal, wherein the access terminal is assigned a first IP address to communicate via the first network and a second IP address to communicate via the second network;
    generating a policy document, at the server, wherein the policy document associates a first application of the plurality of applications with the first network and a second application of the plurality of applications with the second network based on the data associated with the first network, the data associated with the second network, and the data associated with a plurality of applications associated with the access terminal; and
    sending the policy document, from the server, to the access terminal, wherein the policy document instructs the access terminal to use the first IP address to communicate via the first network for the first application and the second IP address to communicate via the second network for the second application.

2. The method of claim 1, wherein the policy document further instructs the access terminal to communicate with a home anchor for the first application and with a visited anchor for the second application.

3. The method of claim 1 further comprising dynamically generating a second policy document to replace the first policy document.

4. The method of claim 1, wherein the data associated with the second network comprises information associated with the functionality of the second network to process the plurality of applications associated with the access terminal.

5. The method of claim 1, further comprising determining an identity of the second network.

6. The method of claim 1, wherein the second network is a visited network.

7. The method of claim 1, wherein a second policy document is generated when the access terminal roams into a third network.

8. The method of claim 1, wherein the first IP address is an IP address of a home anchor located in the first network and the second IP address is an IP address of a visited anchor located in the second network.

9. The method of claim 1, wherein the first network comprises a home network.

10. A system for selecting a network for an application used in a network environment, comprising:
    a home policy server operable to:
    receive data associated with a first network;
    receive data associated with a second network;
    receive data associated with a plurality of applications associated with an access terminal, wherein the access terminal is assigned a first IP address to communicate via the first network and a second IP address to communicate via the second network;
    generate a policy document, wherein the policy document associates a first application of the plurality of applications with the first network and a second application of the plurality of applications with the second network based on the data associated with the first network, the data associated with the second network, and the data associated with a plurality of applications associated with the access terminal; and send the policy document to the access terminal, wherein the policy document instructs the access terminal to use the first IP address to communicate via the first network for the first application and the second IP address to communicate via the second network for the second application.

11. The system of claim 10, wherein the policy document further instructs the access terminal to communicate with a home anchor for the first application and with a visited anchor for the second application.

12. The system of claim 10, wherein the home policy server is further operable to dynamically generate a second policy document to replace the first policy document.

13. The system of claim 10, wherein the data associated with the second network comprises information associated with the functionality of the second network to process the plurality of applications associated with the access terminal.

14. The system of claim 10, wherein the home policy server is further operable to determine an identity of the second network.

15. The system of claim 10, wherein the second network is a visited network.

16. The system of claim 10, wherein a second policy document is generated when the access terminal roams into a third network.

17. The system of claim 10, wherein the first IP address is an IP address of a home anchor located in the first network and the second IP address is an IP address of a visited anchor located in the second network.

18. The system of claim 10, wherein the first network comprises a home network.

19. An apparatus for selecting a network for an application used in a network environment, comprising:
one or more processors;
memory coupled to the one or more processors and configured to store program instructions executable by the one or more processors to:
receive data associated with a first network;
receive data associated with a second network;
receive data associated with a plurality of applications associated with an access terminal, wherein the access terminal is assigned a first IP address to communicate via the first network and a second IP address to communicate via the second network;
generate a policy document, wherein the policy document associates a first application of the plurality of applications with the first network and a second application of the plurality of applications with the second network based on the data associated with the first network, the data associated with the second network, and the data associated with a plurality of applications associated with the access terminal; and send the policy document to the access terminal, wherein the policy document instructs the access terminal to use the first IP address to communicate via the first network for the first application and the second IP address to communicate via the second network for the second application.

20. The apparatus of claim 19, wherein the policy document further instructs the access terminal to communicate with a home anchor for the first application and with a visited anchor for the second application.

21. The apparatus of claim 19, wherein the one or more processors are further operable to dynamically generate a second policy document to replace the first policy document.

22. The apparatus of claim 19, wherein the data associated with the second network comprises information associated with the functionality of the second network to process the plurality of applications associated with the access terminal.

23. The apparatus of claim 19, wherein the one or one or more processors are further operable to determine an identity of the second network.

24. The apparatus of claim 19, wherein the second network is a visited network.

25. The apparatus of claim 19, wherein a second policy document is generated when the access terminal roams into a third network.

26. The apparatus of claim 19, wherein the first IP address is an IP address of a home anchor located in the first network and the second IP address is an IP address of a visited anchor located in the second network.

27. The apparatus of claim 19, wherein the first network comprises a home network.

28. The apparatus of claim 19, wherein a second policy document is generated when the access terminal roams into a different coverage area in the second network.

29. An apparatus for selecting a network for an application used in a network environment, comprising:
means for receiving data associated with a first network;
means for receiving data associated with a second network;
means for receiving data associated with a plurality of applications associated with an access terminal, wherein the access terminal is assigned a first IP address to communicate via the first network and a second IP address to communicate via the second network;
means for generating a policy document, wherein the policy document associates a first application of the plurality of applications with the first network and a second application of the plurality of applications with the second network based on the data associated with the first network, the data associated with the second network, and the data associated with a plurality of applications associated with the access terminal; and
means for sending the policy document to the access terminal, wherein the policy document instructs the access terminal to use the first IP address to communicate via the first network for the first application and the second IP address to communicate via the second network for the second application.

* * * * *